United States Patent Office.

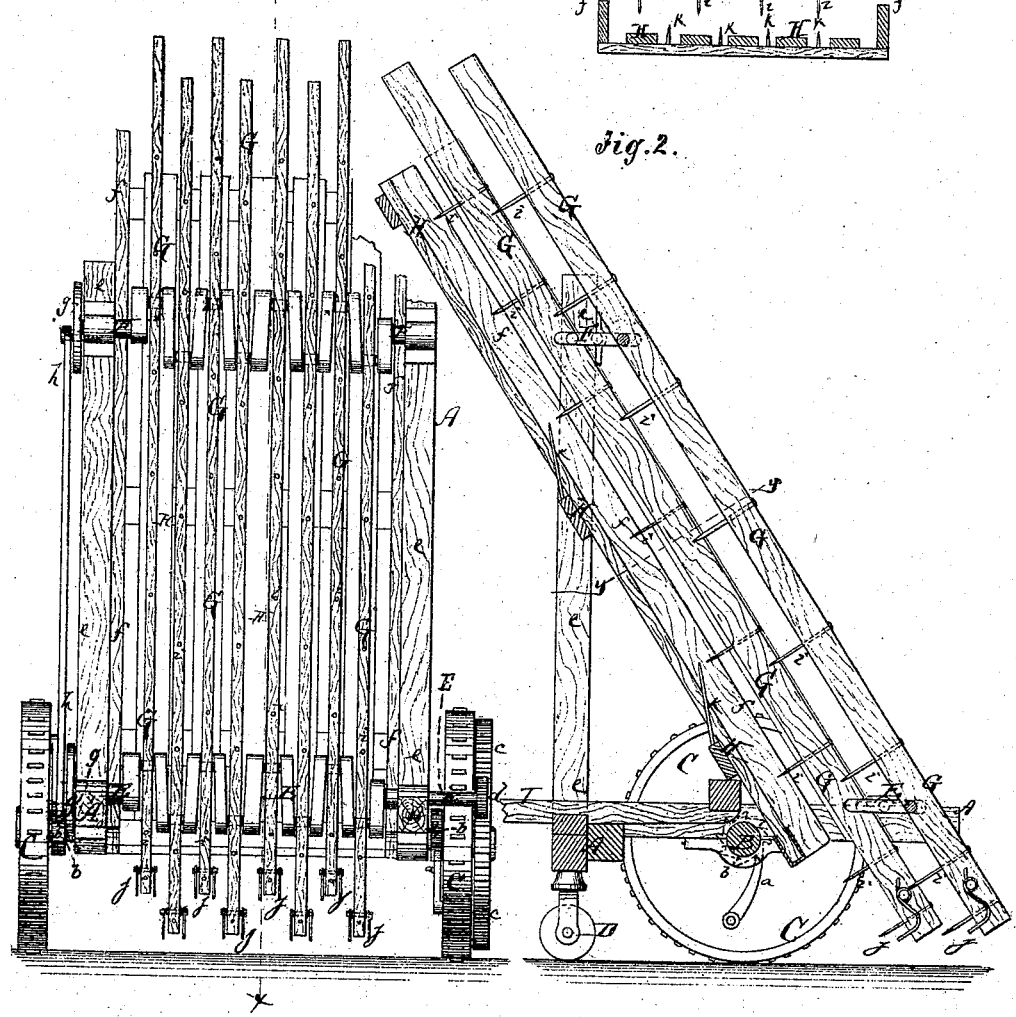

LUMAN D. TAYLOR, OF GRANVILLE CENTRE, PENNSYLVANIA.

Letters Patent No. 113,363, dated April 4, 1871.

IMPROVEMENT IN HAY-LOADERS.

The Schedule referred to in these Letters Patent and making part of the same.

*To all whom it may concern:*

Be it known that I, LUMAN D. TAYLOR, of Granville Centre, in the county of Bradford and State of Pennsylvania, have invented a new and improved Hay-Loader; and I do hereby declare that the following is a full, clear, and exact description thereof, which will enable others skilled in the art to make and use the same, reference being had to the accompanying drawing forming part of this specification, in which—

Figure 1 represents a rear elevation of my improved hay-loader.

Figure 2 is a vertical section the same taken on the plane of line $x\ x$, fig. 1.

Figure 3 is a detail transverse section of the same taken on the plane of the line $y\ y$, fig. 2.

Similar letters of reference indicate corresponding parts.

This invention relates to a new hay-loader, which is to follow a wagon for the purpose of transferring the hay to the same from the ground.

My invention relates to hay-loaders, and will be first described in connection with all that is necessary to a full understanding thereof, and then clearly pointed out in the claim.

A in the drawing represents the frame of my improved hay-loader.

It is in rear mounted upon and supported by a transverse axle, B, carrying the driving-wheels C C.

The front of the frame is or may be supported by caster-wheels D D.

The wheels C hang loosely on the axle and have pawls $a$, that engage into ratchet-wheels $b$ on said axle, so that they will run loose when going backward, and revolve the axle with them when going ahead.

Upon the axle is mounted a toothed wheel, $c$, which meshes into a pinion, $d$, of a transverse shaft, E. This shaft has its bearings in the rear part of the frame A.

The said frame has, at its front part, upright posts $e\ e$, which brace and are braced by inclined beams $f\ f$, that extend forward from the rear of the frame, as shown.

In the upper portion of the posts $e$ are the bearings of another transverse shaft, F.

The two shafts E and F have cranks $g\ g$ at their ends, said cranks being connected by a pitman, $h$.

Thus, by means of said pitman, motion is transmitted to the upper shaft by the lower, both being rotated in the same direction with equal velocity.

The two shafts E and F have between the inclined pieces $f$ a series of cranks, which project in opposite directions, as shown in figs. 1 and 2.

The crank-pins fit through the inclined rake-heads G.

The rake-heads carry numbers of pins $i\ i$, which project downwardly, and at their lower ends they have rake-teeth $j$ for taking the hay from the ground.

A platform, H, slatted or solid, is formed against the lower edges of the inclined pieces $f$, and from it project upwardly and forwardly some pins or teeth $k\ k$, which serve to detain the hay and prevent it from rolling down upon the platform.

The operation is as follows;

The apparatus is set astride a windrow of hay, and is sufficiently wide to take up the entire windrow. It is, by means of a projecting tongue or beam, I, or otherwise, connected with the wagon and moved forward with the same. As the wheels C roll over the ground they serve to impart rotary motion to the shafts E and F, and thereby swing the heads G so that they will move back and down to clear the hay, and forward and upward to take it up. The heads which go back deposit what they had raised to the pins on the ascending heads, and in this manner the hay is gradually elevated until it is thrown over the upper end of the platform H upon the wagon. The teeth $k$ arrest all hay that may by chance drop off some pins $i$, and hold it till it can be taken up by other pins.

This apparatus can be used to take up whole lengths of windrows and deposit them successively within the wagons.

Having thus described my invention,

I claim as new and desire to secure by Letters Patent—

The combination of the vibrating toothed beams G with the platform H, which has the teeth $k$, substantially as herein shown and described.

LUMAN D. TAYLOR.

Witnesses:
A. M. WOOSTER,
WILLIAM BUNYAN.